United States Patent [19]

Weinberg et al.

[11] Patent Number: 4,868,035

[45] Date of Patent: Sep. 19, 1989

[54] ELECTRICAL INSULATING MATERIALS MADE PARTLY OR WHOLLY OF POLYESTER FILM

[76] Inventors: Martin J. Weinberg, 167 Fairview Ave., Stamford, Conn. 06802; Leon Helfand, 197 Rimmon Rd., Woodbridge, Conn.

[21] Appl. No.: 194,100

[22] Filed: May 16, 1988

[51] Int. Cl.$^4$ ........................ B32B 17/04; B32B 33/00; H01B 3/42; H01B 3/48; H01B 17/60

[52] U.S. Cl. ..................................... 428/212; 428/220; 428/294; 428/343; 428/354; 428/409; 428/430; 174/120 SR; 174/121 SR; 156/53

[58] Field of Search ............... 428/212, 220, 343, 294, 428/354, 409; 174/120 SR, 121 SR

[56] References Cited

U.S. PATENT DOCUMENTS

| | | | |
|---|---|---|---|
| 3,188,266 | 6/1965 | Charbonneau et al. . | |
| 3,867,245 | 2/1975 | Herman . | |
| 3,867,758 | 2/1975 | Jackson | 156/56 |
| 4,045,611 | 8/1977 | Torgerson | 174/121 SR |
| 4,271,226 | 6/1981 | Herbreteau | 428/220 |
| 4,761,520 | 8/1988 | Wade et al. | 156/56 |

FOREIGN PATENT DOCUMENTS 599097 3/1948 United Kingdom .

OTHER PUBLICATIONS

Essex Magnet Wire Product and Application Data, Published by United Technologies Essex Group, Aug. 1982.

*Primary Examiner*—James C. Cannon

*Attorney, Agent, or Firm*—William W. Jones

[57] ABSTRACT

Improved electrical insulating tapes are disclosed having a poly(ethylene terephthalate) film component. The film has one amorphous surface and an opposite crystalline surface. In a preferred embodiment, a composite insulating material is provided having the film component with a fiber glass yarn strand layer adhered thereto. The fiber glass yarn strands are substantially continuous and uninterrupted, and are substantially parallel to the axis of elongation of the tape, and to each other.

15 Claims, 1 Drawing Sheet

ELECTRICAL INSULATING MATERIALS MADE PARTLY OR WHOLLY OF POLYESTER FILM

It is known in the art that the excellent dielectric characteristics of polyester resin films, combined with their high strength, and flexibility, make them eminently suitable for use in the insulation of electrical conductors. In particular, poly (ethylene terephthalate) or PET, which provides the added advantage of being relatively inexpensive to make and can easily be extruded into film form, has become a commercially important and widely accepted electrical insulating material. One of the earlier patents in which such utility is recognized is British Pat. No. 599,097 dated Apr. 1, 1948. Since then, numerous variations and improvements have been made in the use of PET film, usually in combination with other materials, as an electrical insulator. Illustrative are U.S. Pat. No. 3,867,245, issued in 1975 to Herman, which discloses an electrical insulating tape having a layer of resin-impregnated micaceous paper, a PET layer, and a plurality of flattened glass yarns therebetween; and U.S. Pat. No. 4,045,611 to Torgerson, which teaches the use of PET fibers in combination with PET film. U.S. Pat. No. 4,271,226 to Herbreteau discloses the application of a PET-based insulation to underwater, high-voltage cable wherein a PET tape having a crystallinity greater than 50% is wrapped under tension over the cable, this operation being accompanied or followed by the application of heat to compact the tape layers and increase the crystallinity order of the resin.

One product which has been widely commercially used for a number of years as an insulation for magnet wire is a combination fiberglass-polyester yarn which is formed from a mixture of fiberglass strands and polyester strands. This insulation yarn is sold by Owens/Corning, among others. This material is widely used at present to insulate magnet wire, but it has several drawbacks which have been accepted by the industry due to the lack of a competing product which avoids these drawbacks while providing equivalent electrical insulating qualities at competitive cost. The problems with the polyester-fiberglass yarn insulation include the rate at which it can be wound onto a wire. This insulation yarn will typically be wound onto the wire at a rate of about 15 feet per minute. This yarn creates only about a 10 mil spread on the wire when wrapped thereon, thus the relatively slow rate at which it can be wound onto a wire. Another drawback relates to the fact that this insulation will bond to the wire, and is not easily strippable therefrom. In fact, it must be ground off of the wire, if the wire is to be stripped.

In accordance with this invention, an improved polyester-based electrical insulating film is provided in sheet or tape form, one surface of which film is amorphous and the opposite surface of which is crystalline. It has been found that the use of polyester insulation film having these opposite surface characteristics yields a number of practical advantages, as will become apparent from the description to follow.

In accordance with a preferred embodiment of the invention, a composite heat dissipating electrical insulation tape is provided which is comprised of a layer of the aforesaid polyester film having substantially continuous fiberglass yarn strands adhered to the crystalline surface thereof, the fiberglass yarn strands being disposed lengthwise of the tape covering substantially all of the crystalline surface of the polyester film layer.

Any of the variety of film-forming polyester resins known in the art may be used in making the insulating materials of the invention. Preferably, the polyester is a highly polymerized product of the reaction of a dibasic acid with a glycol. For practical reasons, the poly(alkylene terephthalate) resins are especially preferred. These can be prepared by well-known methods from terephthalic acid, or an ester-forming derivative thereof, and a glycol. The latter is represented by the formula $$HO(CH_2)_nOH$$

in which "n" is an integer from 1 to 20, preferably 1 to 10. For a more detailed description of such polyesters and their preparation, see the aforesaid British Pat. No. 599,097, the entire disclosure of which is incorporated by reference herein. By virtue of its relative low cost of manufacture, universal availability and highly desirable dielectric and other physical properties, poly(ethylene terephthalate) is the most preferred polyester material for use in practicing this invention.

As noted earlier, a unique characteristic of the polyester film which is employed in the invention, is that the opposite surfaces of the film are in the amorphous and crystalline states, respectively. The practical advantages attendant to the use of such a material are predicated on the finding that the amorphous surface, when subjected to the simultaneous application of pressure and heat, bonds to any surface which will be found in an insulated electrical wire assembly with which it is in compressive contact. By contrast, the crystalline side is uneffected by the temperature/pressure conditions that will bring about the bonding on the amorphous side. Thus the crystalline surface will neither soften nor undergo any perceptible physical change.

It is important to note that the bonding of the amorphous side takes place only where both heat and pressure are applied simultaneously thereto. Thus if a segment or strip of the amorphous surface, which is not under pressure, is heated during the application of the insulation tape to the wire, it will not undergo any bonding, but rather, it will retain its amorphous state. As such, this segment or strip would still be susceptible to bonding by the application of heat and pressure to the amorphous side thereof in a subsequent operation.

In practicing the invention, the polyester film, in tape or strip form, may be wrapped spirally over the electrical conductor. The tape spirals may be overlapped to varying degrees, or may be disposed in abutting relationship. The tape or strip may be of any desirable thickness, for example from about 0.00025 to about 0.025 inch. For a detailed description of a spiral winding technique and suitable equipment that may be used therefor, reference is made to U.S. Pat. No. 3,997,122, granted Dec. 14, 1976.

Although any means may be used to impart pressure to the tape during or after it is wrapped over the conductor, conveniently this pressure can be achieved by simply carrying out the wrapping operation while the tape is under tensile stress. As a result, the tape's amorphous surface will be under sufficient pressure so that the application of heat will bring about the bonding. The heat can of course be applied by any suitable expedient. Conveniently the wrapped wire is passed through an oven at a rate of travel calculated to allow for sufficient residence time inside the oven to bring about the bonding.

In those applications in which it is desirable or necessary to produce an insulated conductor to which the insulation is permanently bonded (and is thus difficult to strip off), the polyester tape or strip is applied with the amorphous surface on the inside, facing the conductor. Upon the application of simultaneous heat and pressure to the assembly, the amorphous surface will become firmly bonded to the conductor.

Consider now an alternative wrapping operation in which the crystalline surface of the tape is placed on the inside, facing the conductor. Since the subsequent application of heat and pressure necessary to bring about the bonding of the amorphous surface will not affect the crystalline surface, no fusion or bonding will take place between the tape surface and the conductor surface. Thus this technique would be suitable for making easily strippable insulated conductors. Moreover, if the tape is overlapped and the wrapping operation is carried out while the tape is under tensile stress, the resulting compressive pressure between the overlapping segments of the tape will, upon the application of heat, bring about a bonding of the overlapped segments, to the exclusion of the non-overlapped outer surface of the tape. Consequently, the overlapped segments will become bonded together, whereas, the outer, exposed surface will retain its amorphous state. As such, the outer exposed surface of the wrapped wire would still be susceptible to being later subjected to simultaneous compression and heat, whereupon the bonding would occur. This would be advantageous for example where it is desirable to adhere the outer surface of the wrapped conductor to another surface, e.g., to a supporting structure or an additional protective layer, without having to use any adhesive coating. It would also be particularly suited in those applications in which a wrapped wire is formed into coils. The coils could then be subjected to heat and pressure, causing a fusing of the abutting amorphous surfaces of the coils, whereby the coils will become bonded together into a substantially integral, unitary body.

Pursuant to the preferred embodiment of the invention, polyester film, as generally described above, is used in combination with a layer of substantially continuous fiberglass yarn strands to provide a composite electrical insulation and heat dissipating material. Thus in accordance with this embodiment, an electrical conductor is provided having an insulation comprised of a polyester film layer and fiberglass yarn strands bonded to a surface of the polyester film layer. It is important that the fiberglass strands be in yarn form with the fiberglass yarn strands being distributed in substantially non-overlapping fashion and longitudinally substantially parallel to the axis of elongation of the polyester film tape. These yarn strands can be of any suitable or available diameter such as about 3–10 mils. Preferably, the fiberglass yarn strands will be 5 mils or less in diameter so as to minimize the thickness of the composite insulating tape. In this preferred embodiment, the fiberglass yarn strands will all be substantially parallel to each other, and to the axis of elongation of the tape, and substantially none of the strands will be skew to the axis of elongation of the the tape, insofar as possible. Additionally, each fiberglass yarn strand will preferably be substantially continuous and substantially uninterrupted for the entire length of the tape, insofar as is possible.

The weight ratio of glass fibers to polyester film may be varied over a wide range, depending on the thickness of the composite insulation and the utility to which it is put. The range of usable ratios is from about 3:1 to about 15:1 glass to polyester. The preferred ratio is 5:1 or less, glass to polyester.

Any suitable expedient or method may be used to apply the fiberglass yarn strands to the PET film. Conveniently, the fiberglass yarn strands may first be bonded to the crystalline side of a stock sheet of a master roll of the polyester film by means of a thermosetting or other suitable adhesive and/or bonding agent. Preferably the adhesive is a material which wets the fiberglass yarn strands and does not adversely affect the final product. A variety of suitable adhesive materials are known in the art including, for example: acrylic, silicone and synthetic rubber adhesives; epoxies; and urethanes. The temperatures required to activate the adhesive, when a thermosetting adhesive is used, should be lower than the temperature required to activate the amorphous side of the film since the fiberglass yarn strands will be compressed against the film during the adhering operation. The resultant composite stock sheet will then be slit into tapes or ribbons, of whatever width is desired. The fact that the fiberglass yarn strands are as continuous as possible also results in the ability to slit a stock sheet of the material into tapes or ribbons with minimal fraying of the edges on the resultant tapes.

It is also preferable, for ease of application of the fiberglass yarn strands to the crystalline surface of the polyester film, that such surface have a matte finish. The "matte finish" preferably will comprise microscopic pitting of the crystalline surface, operable to coarsen the crystalline surface whereby an improved bond between the fiberglass yarn strands and the PET film is achieved. A suitable PET film is sold by I.C.I. Americas under the trademark "Melinex". This film has been found to be eminently suited for use in the insulation of this invention when formed with the opposed amorphous and crystalline surfaces described above.

The composite insulating tape is applied to the electrical conductor in tape form. The spiral, overlapping method of wrapping the tape over the conductor, which is described hereinabove, may be used in applying the tape to the conductor wire. This tape can also be applied to the conductor in either of two possible modes, one with the fiberglass yarn strand layer facing the conductor, and the other with the amorphous surface of the tape facing the conductor. If the fiberglass yarn strands are disposed against the conductor wire, the insulation will be readily strippable from the conductor. Additionally, since the fiberglass yarn strand layer will not bond to the conductor, cracking and fracturing of the fiberglass yarn strand layer is minimized when the insulated wire is bent or twisted, because of the relative slippage which can occur between the conductor and the insulation. If the fiberglass yarn strand face of the tape is outwardly disposed, then the insulation will bond to the conductor wire. The substantially continuous nature of the fiberglass yarn strands results in a resistance to delamination of the strands from the film when the strands face outwardly.

The advantages deriving from the use of the fiberglass yarn strand layer are three-fold. First, the strands impart additional strength and durability to the composite insulation. Secondly, and more importantly, by virtue of the heat conductive properties of the fiberglass yarn strands, they serve the additional function of enhancing the dissipation of heat which is generated by the flow of current through the conductor. Finally, and quite importantly, the presence of the glass component ensures that should environmental heat encountered during use of the insulated wire cause burnout of the film component thereof, then the resultant air gaps created in the wrap will be preserved by the glass component. Thus the electrical insulating capability of the wrap will not be lessened.

The invention will be more readily appreciated by reference to the accompanying drawings, in which.

Figure 1:
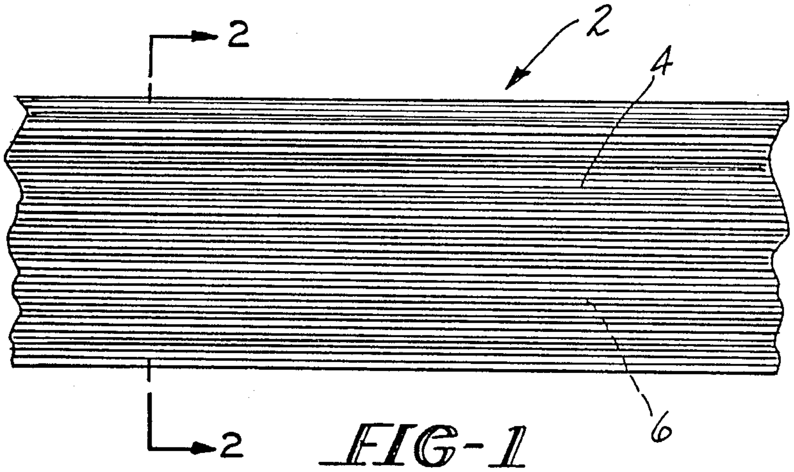
FIG. 1 is a plan view of a section of the preferred embodiment of an electrical insulating tape formed in accordance with this invention.
Figure 2:
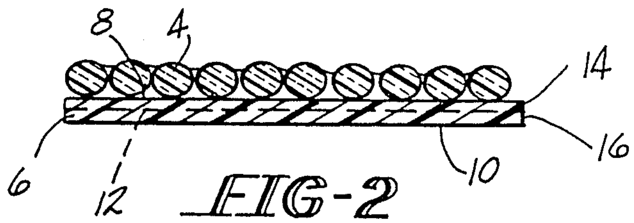
FIG. 2 is a sectional view of the tape of FIG. 1 taken along line 2—2 of FIG. 1.
Figure 3:
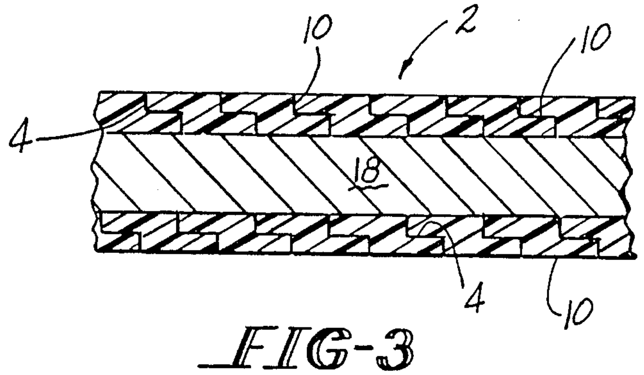
FIG. 3 is a sectional view of a conductor wire wrapped with the tape of FIGS. 1 and 2, the view taken along the axis of the wrapped conductor.

Referring now to the drawings, the insulating tape, denoted generally by the numeral 2 is the preferred type which has the fiberglass yarn strands 4 adhered to the PET film 6. As previously noted, the strands 4 are all substantially parallel to each other, and to the axis of elongation of the tape 2. The surface 8 of the film 6 to which the fiberglass yarn strands 4 are adhered has the matte finish as previously described, and is the crystalline surface of the film 6. The opposite surface 10 of the film 6 is amorphous. The interface between the crystalline and amorphous sides of the film 6 will occur generally medially of the thickness of the film, and is generally denoted by the phantom line 12. It will be understood that the phase change is not believed to occur abruptly. Thus, the portion 14 of the film 6 will be crystalline, and the portion 16 of the film 6 will be amorphous. FIG. 3 shows an electrical conductor wire 18 wrapped with the insulation tape of FIGS. 1 and 2. The tape is wrapped in a spiral fashion having about a 50% overlap. The fiberglass yarn strand surface 4 of the tape 2 faces toward the conductor wire 18, and the amorphous surface 10 of the tape 2 faces away from the conductor wire 18. The overlapped portions of the amorphous side 10 which abut the fiberglass surface 4 thus bond to the fiberglass surface 4. Once bonded, the amorphous surface 10 of the tape 2 fuses onto the fiberglass yarn strands which the surface 10 contacts, thereby preventing future unraveling of the fiberglass yarn strands from the insulated conductor. The exposed outer surface of the wrapped conductor will remain in the amorphous state and will be capable of being bonded later, if so desired. The conductor wire 18 is contacted only by fiberglass yarn strands, which do not bond to the conductor 18. This form of the insulation wrap exhibits easy stripability, and excellent heat dissipation.

The improved polyester, and polyester-composite insulation disclosed herein can be used to insulate a wide-ranging variety of electrical current-conducting bodies or structures, including low-voltage wiring, high voltage cables and a variety of electrical devices. In addition to their excellent dielectric and other known properties, deriving from the use of polyester film therein, the insulation of this invention has additional particularly desirable features. One of these desirable features is the fact that the insulation can be used in one of two different orientations on the conductor which will produce different physical characteristics in the insulated conductor. In the case of the composite polyester-fiberglass yarn strand insulating materials of the invention, this preferred embodiment is further characterized by improved heat dissipating properties, owing to the relatively high ratio of glass to film therein.

The foregoing description is provided to highlight and illustrate the preferred embodiments of the invention. It will become readily apparent that various modifications and adaptations can be made within the scope of the invention as defined in the appended claims.

What is claimed is:

1. An electrical insulating sheet or tape product having an axis of elongation and comprising a poly(alkylene terephthalate) film component characterized by said film component having one substantially amorphous surface and an opposite substantially crystalline surface.

2. The product of claim 1 wherein said film component is poly(ethylene terephthalate).

3. The product of claim 2 wherein said film component has a thickness from about 0.00025 to about 0.025 inch.

4. The product of claim 3 wherein said film component has a thickness of 0.005 inch or less.

5. The product of claim 2 further including a fiberglass component comprising a layer of substantially continuous and uninterrupted fiberglass yarn strands, the axes of which strands are all substantially parallel to each other and also substantially parallel to the axis of elongation of said product, said strands being adhered to and covering substantially all of said crystalline surface of said film component.

6. The product of claim 5 wherein said crystalline surface has a matte finish.

7. The product of claim 5 wherein the ratio of said fiberglass component to said film component is in the range of about 3:1 to about 15:1 so as to maximize the heat dissipation characteristics of the product with respect to the thickness of the product.

8. The product of claim 7 wherein the ratio of the fiberglass component to the film component is 5:1.

9. The product of claim 1 further including a layer of substantially continuous and uninterrupted fiberglass yarn strands, the axes of which are all substantially parallel to each other and also substantially parallel to the axis of elongation of said product, said strands being adhered to and covering substantially all of said crystalline surface of said film component.

10. The product of claim 9 wherein said crystalline surface has a matte finish.

11. An electrical insulating sheet of tape product having an axis of elongation and comprising: a poly(alkylene terephthalate) film component having one amorphous surface and an opposite crystalline surface; and a layer of fiberglass adhered to and covering substantially all of said crystalline surface of said film component.

12. The product of claim 11 wherein said layer of fiberglass consists of substantially continuous and uninterrupted fiberglass yarn strands, the axes of which strands are all substantially parallel to each other and also substantially parallel to the axis of elongation of said product.

13. The product of claim 11 wherein said crystalline surface has a matte finish.

14. An electrical insulating sheet or tape product having an axis of elongation and comprising: a dielectric, synthetic polymeric material component having one amorphous heat bondable surface and an opposite crystalline surface; and a layer of substantially continuous and uninterrupted fiberglass yarn strands, the axes of which strands are all substantially parallel to each other and to the axis of elongation of said product, said strands being adhered to and covering substantially all of said opposite surface of said dielectric component, said fiberglass yarn strands being present in the range of about 3:1 to about 15:1 by weight, fiberglass to dielectric material, in order to maximize the heat dissipation qualities of the product.

15. The product of claim 14 wherein said crystalline surface has a matte finish.

* * * * *